May 27, 1969  J. E. LEMOINE ET AL  3,445,886
APPARATUS FOR TRANSVERSELY STRETCHING MOVING FILM
Filed Dec. 1, 1965

JEAN E. LEMOINE
MARCEL F. CATINAT
INVENTORS

BY *Thomas R Lampe*
*Robert W Hampton*
ATTORNEYS

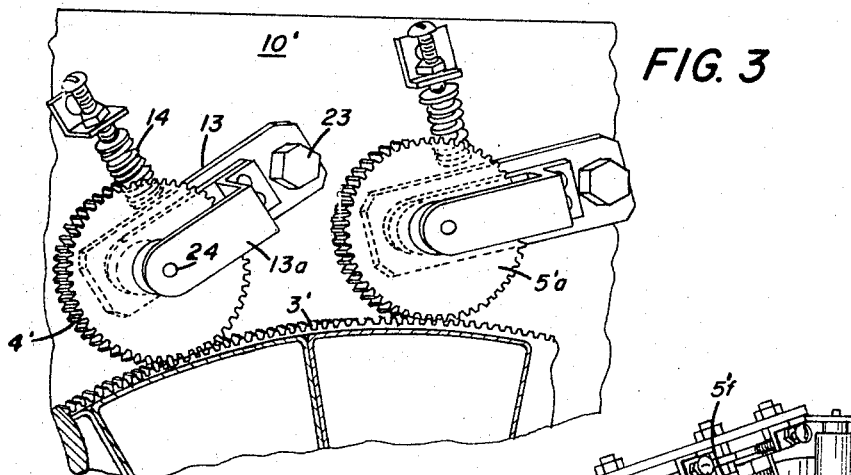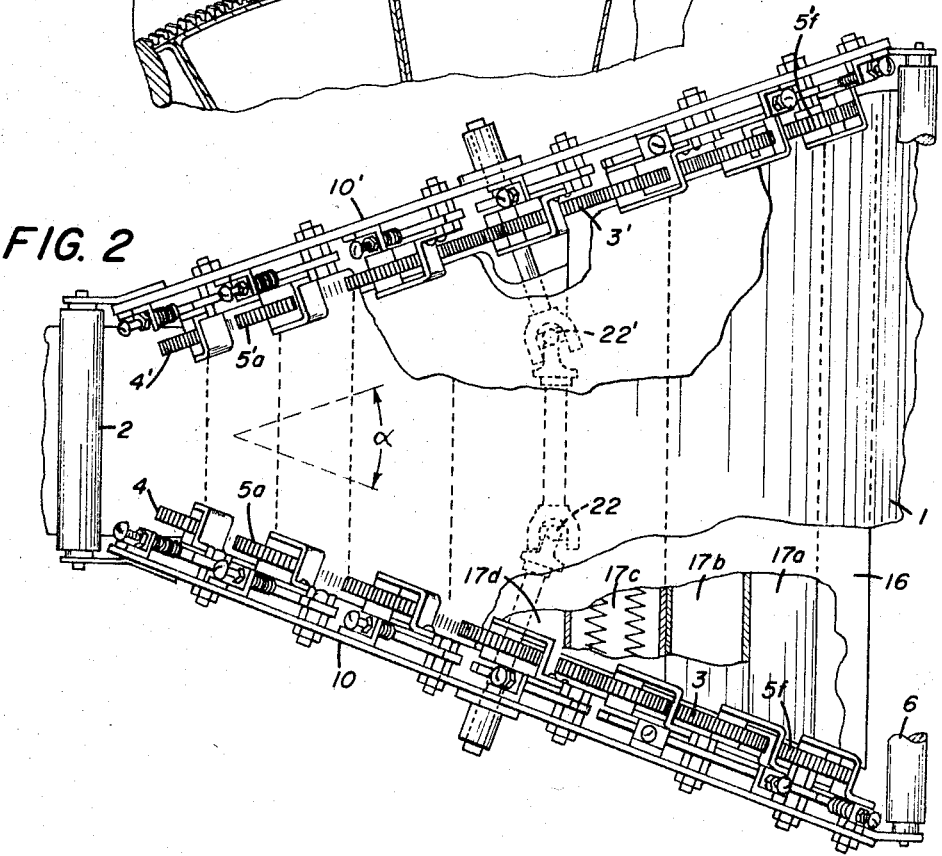

United States Patent Office 3,445,886
Patented May 27, 1969

3,445,886
APPARATUS FOR TRANSVERSELY STRETCHING MOVING FILM
Jean E. Lemoine and Marcel F. Catinat, both of Kodak-Pathe, 30 Rue de Vignerons, Vincennes, Val-de-Marne, France
Filed Dec. 1, 1965, Ser. No. 510,796
Claims priority, application France, Dec. 3, 1964, 997,210
Int. Cl. B29c 17/02
U.S. Cl. 18—1                    7 Claims

ABSTRACT OF THE DISCLOSURE

An apparatus is provided for transversely stretching a film which comprises a pair of rotatable drive gears each having gear teeth about the periphery thereof, said gears being disposed at an angle with respect to one another such that they diverge in the direction of film movement so as to spread and stretch the film in the transverse direction.

---

The present invention relates to the manufacture of plastic films or sheets and more particularly to a method and apparatus for continuously stretching long-length films to improve the properties thereof.

In the manufacture of films from thermoplastic polymeric materials, the conventional practice is to extrude the molten polymer as a continuous sheet which is then quenched by any known expedient. To convert the extruded film to a more useful article, with improved physical properties, it is generally oriented by being "biaxially" stretched in two mutually perpendicular directions. Generally, when handling flat films, a "biaxial" stretching is done in two successive operations. The films can be stretched first in a longitudinal direction, then transversely, but they may also be stretched transversely first and then longitudinally.

Various apparatus and methods have been proposed for effecting transverse stretching of long-length thermoplastic films. Such apparatus are usually complex, prone to mechanical failure, and have often proven unsatisfactory from the standpoint of providing for the stretching of a film web without undesired distortion, wrinkling or tearing.

It is accordingly a primary object of this invention to provide an apparatus for the transverse stretching of film material which is self-feeding and which is especially economical in use because virtually all friction between the film and the parts of the machine is eliminated during the stretching operation, so that the expenditure of energy necessary for proper functioning thereof is reduced.

It is an additional object of this invention to provide a method and apparatus for the transverse stretching of a film which has no tendency to spread, in the course of the transverse stretching, any localized defect in the film, such as a tear or a hole, thereby avoiding the necessity of throwing away considerable lengths of waste film.

A still further object of the invention is to provide a method and apparatus for the transverse stretching of thermoplastic films wherein wrinkling of the film during the stretching operation is eliminated.

These objects have been attained in the present invention by providing a method and apparatus for the transverse stretching of thermoplastic film which utilizes two non-parallel drive gears as the holding and stretching means for the film and wherein a plurality of pinions is disposed about the periphery of the drive gears to grip the film and maintain it in contact with the drive gear surfaces during the stretching operation.

Other objects, purposes, and characteristic features of the present invention will be obvious from the accompanying drawings and from the following description of the invention. In describing the invention in detail, reference will be made to the accompanying drawings in which like reference characters designate corresponding parts throughout the several views, and in which:

FIG. 2 is a partial top plan view with parts broken away and diagrammatically illustrating the embodiment of the present invention according to FIG. 1;

FIG. 3 is a fragmentary, front elevation view, partly in section, showing a pair of pinions and their operative association with one of the drive gears incorporated in the embodiment of the invention according to FIG. 1;

Figure 1:
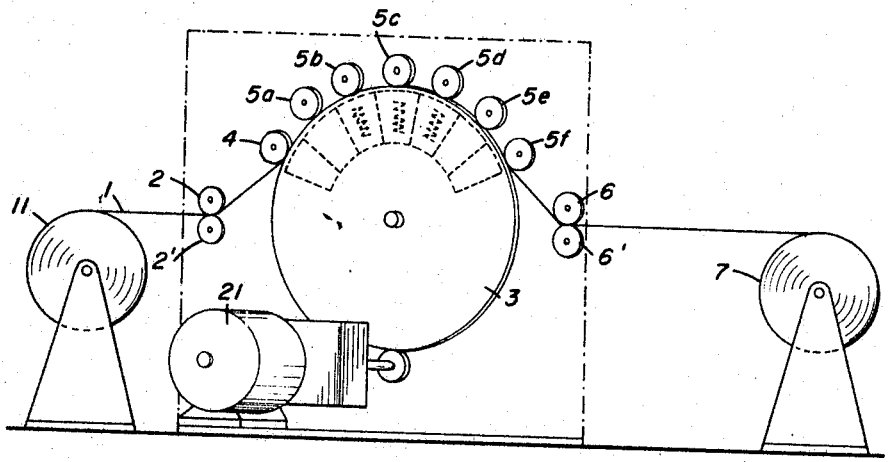
FIG. 1 is an elevational side view diagrammatically illustrating one embodiment of the stretching apparatus according to the present invention.

Referring now to FIGS. 1 and 2, film 1, which is to be stretched in a direction transverse to its direction of movement, passes from a rotatable feed roller 11 and between two entry cylinders 2, 2′, which serve to properly orient and tension the film. Passing from the entry cylinders 2, 2′, the film is contacted by drive gears 3, 3′ having a plurality of teeth about the periphery thereof and, as may be most clearly seen with reference to FIG. 2, form between the inner surfaces thereof an angle α, which is preferably in the order of 40°. Gear 3 is driven directly through a speed reducer mechanism by a motor 21 (FIG. 1) of any conventional type. Drive gear 3′ is connected to drive gear 3 by means of a double universal joint 22, 22′ (although any equivalent kinematic chain could be used) so that the drive gears 3, 3′ are driven in unison at a uniform speed.

As the film 1 exits from entry cylinders 2, 2′ and approaches the peripheral surfaces of the drive gears 3, 3′, it is contacted by a pair of crimper pinions 4, 4′ which have teeth thereon engaging the teeth of the drive gears 3, 3′. As may be seen with particular reference to FIG. 2, in addition to crimper pinions 4, 4′, drive gears 3, 3′ have associated therewith a plurality of additional pinions, all of which have teeth contacting the peripheral teeth of the drive gears and all of which are disposed along a straight line with respect to one another. Thus, in addition to crimper pinion 4, drive gear 3 has disposed about the periphery thereof pinions 5a, 5b, 5c, 5d, 5e and 5f while drive gear 3′ has associated therewith a like number of additional pinions such as those indicated by reference numerals 5′a and 5′f (FIG. 2). As may be seen with particular reference to FIGS. 2 and 3, side walls 10 and 10′ are disposed in parallel relation to drive gears 3 and 3′ to provide mounting surfaces for the pinions and the drive gears. As may be seen with particular reference to FIG. 3, each of the pinions is freely rotatably mounted on an axle 24 which is affixed to an associated lever 13 by a bracket 13a. The levers are mounted for oscillating movement on their associated side walls by means of pins 23 attached to the walls. Coil springs 14 are also attached to the walls in any known manner, such as by a bracket, and bear in a downward direction on their associated levers 13, thereby urging the teeth of the pinions into engagement with the drive gears. This structural refinement makes possible the stretching of films of varying thicknesses without in any way modifying the machine.

Returning now to FIG. 2, a film support 16 is shown which is disposed between drive gears 3, 3'. The outer surface of the film support is smooth and may be of polished metal but it is preferably constructed out of a thin, fiberglass fabric. Material of this type has a low coefficient of friction and has desirable thermal characteristics. The outer film contacting surface of film support 16 must be of such a shape as to conform to the general outline of drive gears 3, 3' which results in a slightly elliptical cross-section thereof due to the angle of divergence of the two drive gears with respect to one another. Film support 16 covers a plurality of hollow chambers, such as those indicated by reference numerals 17a, 17b, 17c, 17d, which are constructed of plates formed of brass or other heat-conducting metal.

According to the chemical nature of the processed film, it may be necessary to heat it in the course of stretching; but it is advantageous for handling purposes that the beginning and end of the stretching process be carried out while the film is in a semi-cooled state. For economic reasons, it is advantageous to reduce the heat as much as possible and with some kinds of films it may be completely eliminated.

For these reasons, a number of the centrally located hollow chambers have disposed therein insulated electrical resistance heaters, illustrated schematically in FIG. 2 with respect to hollow chamber 17c, which heaters are separately controlled by the operator in any known fashion, so that they may heat the film support 16 to the desired temperature. The end hollow chambers have no resistance heaters therein so that the film is cool during the initial and final stages of the operation. Film support 16 and its associated hollow chambers are fixed in any known manner to allow the film to pass freely thereover upon rotation of the drive gears 3, 3'.

Figure 5:
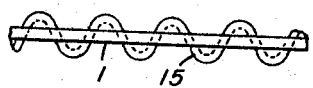
FIGS. 4 and 5 are fragmentary views illustrating the transverse and longitudinal profiles, respectively, of the crimped film at the start of the stretching process.
Figure 4:
Figure 6:
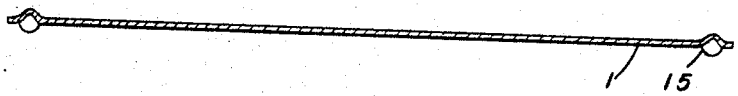
FIG. 6 is a cross sectional view of the transverse profile of the film at the final stage of the transverse stretching thereof.

The operation of the device will now be described. As the film which has previously passed through entry cylinders 2, 2' reaches the vicinity of crimper pinions 4, 4', the crimper pinions under the continuous urging of their associated coil spring 14 force the film into the teeth of the associated drive gear to form embossed top and bottom surfaces thereon comprising alternating indentations 15 along the margins of the film (see FIGS. 4 and 5). As the film is continuously urged along by rotation of the drive gears 3, 3', it is gradually stretched due to the inclination of the drive gears with respect to one another and the frictional engagement of the embossed surfaces by the successive pinions. Stretching of the thermoplastic material is aided by the heating thereof as it gradually moves over film support 16. As the stretched film reaches the vicinity of pinions 5f, 5'f, it is stretched in the manner shown in FIG. 6. The film, which is now in a substantially cool state, then passes through a pair of exit rollers 6, 6' which serve to position the film prior to it being taken up on take-up reel 7, which may be of any known type.

A very important advantage of the above arrangement is that any localized defect in the film, such as a tear or a hole, tends to remain localized due to the multiple points of attachment about the periphery of the drive gears. In addition, the gradual stretching of the film presents only a low resistance to the advancement thereof due to the elimination of the attachment clasps which are present in machines which are customarily used. Consequently, the apparatus can be driven by a low power motor. A still further advantage of an arrangement of this type is that it is self-feeding. It is enough to merely engage the leading edge of a roll of film with the engaging surfaces of the drive gears and the crimper pinions. It is not necessary to have an already stretched leader which has to be placed in the machine before starting, as is the case with other mechanisms.

Although only one specific embodiment of the present invention is disclosed herein, it should be understood that the particular form disclosed has been selected to facilitate explanation of the invention rather than to limit the number of forms which it may assume. For example, the teeth of the drive gears and the associated pinions may be of any shape, including straight, helicoidal or chevron-shaped. In addition, the number of pinions operatively associated with the drive gears may be increased or decreased. Means may also be provided for varying the angle $\alpha$ formed by the drive gears 3, 3' so that the film may be stretched to varying thicknesses as desired by the operator. Further, it should be understood that various additional modifications, alterations, and adaptations may be applied to the specific form described to meet the requirements of practice without in any manner departing from the spirit or scope of the present invention.

What is claimed is:
1. An apparatus for transversely stretching a moving film comprising:
 a pair of rotatable spaced drive gears, each drive gear having a plurality of gear teeth on the periphery thereof, said drive gears being angularly divergent with respect to one another in the direction of film movement;
 drive means for rotating said drive gears in unison at the same speed; and
 means positioned adjacent said gear teeth for mating therewith with the film gripped therebetween whereby said film is stretched as it is conveyed on said gear teeth by the rotation of said drive gears.
2. The invention according to claim 1 further comprising means for disengaging and accumulating said stretched film.
3. The invention according to claim 1 further comprising:
 film support means positioned between said drive gears below the film path; and
 heating elements in said film support means for heating said film as it passes thereover, thereby facilitating the stretching of said film.
4. The invention according to claim 1 wherein said mating means comprises a pair of rotatably mounted crimper pinions; one of said crimper pinions having teeth engageable with the teeth of the one of said drive gears and the other of said crimper pinions having teeth engageable with the teeth of the other of said drive gears.
5. The invention according to claim 4 further comprising a plurality of additional rotatably mounted pinions disposed for engagement with the teeth of said drive gears;
 said additional pinions gripping the surface of said film for further stretching said film.
6. The invention according to claim 5 wherein biasing means is associated with said pinions to urge them into engagement with the respective drive gears.
7. The invention according to claim 3 wherein said film support means includes a film contacting surface of fiberglass fabric for facilitating movement of the web thereover.

References Cited

UNITED STATES PATENTS 3,004,284  10/1961  Limbach _____ 18—1
3,055,048  9/1962   Koppehele _____ 264—289
3,261,903  7/1966   Carr _____ 264—288

FOREIGN PATENTS 479,492    1937     Great Britain.

JULIUS FROME, Primary Examiner.

HERBERT MINTZ, Assistant Examiner.

U.S. Cl. X.R.

26—59; 264—288, 289